3,450,670
STABILIZED POLYPHENYLENE ETHER
COMPOSITION
Klaus E. Holoch and Arthur Katchman, Pittsfield, Mass.,
and Rainey A. Shufelt, Cohoes, N.Y., assignors to General Electric Company, a corporation of New York
No Drawing. Filed Jan. 27, 1967, Ser. No. 612,085
Int. Cl. C08g 51/56, 51/58, 51/60
U.S. Cl. 260—45.9                            7 Claims

ABSTRACT OF THE DISCLOSURE

A stabilized polyphenylene ether composition consisting of a major portion of a polyphenylene ether and a minor portion of a stabilizer consisting of an octaalkylpyrophosphoramide and a boron compound.

---

This invention relates to polyphenylene ether plastics, and more particularly, to the stabilization of such plastics with a stabilizer consisting of an octaalkylpyrophosphoramide and optionally, a boron compound.

It is known that the polyphenylene ethers, and particularly, the 2,6-dialkyl substituted polyphenylene ethers, are somewhat unstable under the influence of heat and light exposure, causing the resin to become dark colored, brittle, and undesirable for many uses. The cause of the degradation is not fully understood, but is believed to be due, in part, to the presence of hydroxyl groups on the polymer chain, a sensitivity to oxygen containing atmospheres, and the degradative effects of traces of impurities present in the resin composition.

The term "polyphenylene ether" includes those polymers disclosed and claimed in U.S. Patent Nos. 3,306,874 and 3,306,875 of Allan S. Hay; the polymers disclosed and claimed in U.S. Patents Nos. 3,257,357 and 3,257,358 of Gelu Stoeff Stamatoff (all incorporated herein by reference); and the various copolymers and blends of the polyphenylene ethers formed by copolymerizing or blending the polyphenylene ethers with other monomers or polymers such as the polyolefins, polystyrenes, polycarbonates, and the like, wherein the polyphenylene ether is present in an amount sufficient to significantly effect the properties of the polymer composition due to the influence of heat and light.

Heretofore, a large number of different compounds such as the phenolic antioxidants exemplified by p-phenylphenol, N-steroyl-p-aminophenol and 2,2'-methylene-bis (4-ethyl-6-tert.-butylphenol) have been used as heat and light stabilizers for the polyphenylene ether compositions. These stabilizers have been generally found to be unsatisfactory for even short exposures to heat and light. Other stabilizers such as the ketenes, benzoic anhydride and the mercaptobenzimidazoles have also been tried, and found to be effective for short periods of exposure, but not for the relatively long exposures required for many commercial applications.

In co-pending U.S. patent application Ser. No. 610,134, it is disclosed that the addition of a small amount of a hexaalkylphopshoric triamide is a very effective stabilizer for the polyphenylene ethers when added in an amount ranging between 0.01 and about 10% by weight, calculated on the polymer.

It has now been found that the octaalkylpyrophosphoramides, particularly when used in combination with a boron compound, are highly effective stabilizers for the polyphenylene ethers are exemplified by a time to embrittlement increase of at least 150% as compared to a polyphenylene ether containing a hexaalkylphosphoric triamide stabilizer.

The octaalkylpyrophosphoramides may be represented by the following general formula:

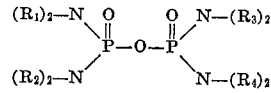

wherein $R_1$, $R_2$, $R_3$ and $R_4$ represent alkyl groups having from 1–6 carbon atoms.

The boron compound that may be used in combination with the octaalkylpyrophosphoramides is preferably one selected from the group consisting of:

(a) boron oxide ($B_2O_3$)
(b) boron acids of the formula

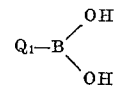

wherein $Q_1$ is a member selected from the group consisting of hydroxyl, $C_1$–$C_{15}$ alkyl and monocyclic aryl; and (c) boron esters of the formula

where $Q_2$, $Q_3$ and $Q_4$ are members selected from the group consisting of hydrogen, $C_1$–$C_{20}$ alkyl and monocyclic aryl, provided that at least one of said $Q_2$, $Q_3$ and $Q_4$ be other than hydrogen.

Typical boron acids corresponding to the formula set forth in subparagraph (b) above are, for example, boric acid, methyl boric acid, ethyl boric acid, butyl boric acid, hexyl boric acid, 2,2'-dimethylheptyl boric acid, 2-methyl-3-3ethyloctyl boric acid, etc.

Typical examples of boron esters, corresponding to the general formula set forth in subparagraph (c) above, are for example, trimethyl borate, dimethyl ethyl borate, tripropyl borate, tri-n-butyl borate, tricyclohexyl borate, tri-i-butyl borate, methylpropyl-n-cyclohexyl borate, methyldiphenyl borate, tri-n-octyl borate, triphenyl borate, diphenyl borate, 2,3-dimethylpentyl-n-butyl borate, 5-n-nonyl borate, dicyclohexyl-2-methyl-4-tert. butyloctyl borate, tridodecyl borate, trioctadecyl borate, 3-propylheptylmethyl borate, etc.

The amount of stabilizer added to the polyphenylene ether depends upon the activity of the stabilizer, the quality of the polymer to be stabilized, and the conditions to which the polymer is to be exposed. The stabilizer may be added in an amount of between 0.1 and 10.0% by weight, calculated on the polymer, and preferably in an amount of between 1.0 and 6.0% by weight, calculated on the polymer. In general, the octaalkylpyrophosphoramide portion of the stabilizer composition should be at least equal to the amount of boron compound, and preferably, should be equal to twice the boron compound.

In the preferred embodiment of this invention, the stabilizer composition is composed of from 1–3 parts by weight octaalkylpyrophosphoramide, and from 0 to 1.5 parts and preferably from 0.5 to 1.5 parts by weight boron compound.

The manner of adding the stabilizer to the polyphenylene ether is not critical to this invention. Hence, any convenient method can be employed. For example, the stabilizer can be blended with the resin powder in a blender, such as a Waring blendor. Alternatively, the resin can be dissolved in a suitable solvent and the stabilizer added to the solution. The stabilized polymer may then be recovered from solution.

The stabilized compositions of this invention are useful for all purposes for which the polyphenylene ethers have hitherto been used, for example, for conversion to films, fibers, molded articles and the like, by conventional methods.

The following examples serve to illustrate the invention, but they are not intended to limit it thereto, the parts being by weight unless otherwise stated.

EXAMPLES 1–11

A poly-(2,6-dimethyl-1,4-phenylene) ether in powder form, and a desired quantity of the stabilizer, are mixed together in a Waring Blendor. The resulting mixture is extruded at a temperature varying between about 500–600° F., and the extruded strands so formed are chopped into pellets. Two gram samples of the pellets are pressed into films by preheating the pellets at a temperature of 550° F. for one minute, and thereafter, pressing at a temperature of 550° F. at a pressure of 20,000 p.s.i. for one minute. The resulting films are about ten mils thick. They are allowed to cool and cut into strips measuring approximately 0.5 by 4.0 inches. The stabilizers are evaluated by subjecting the film sample to heat aging in an air circulating oven maintained at 175° C. and determining the time to embrittle. This is determined by folding the film sample at various times during the heat aging period until a film strip embrittles to a point where it snaps when partially folded.

The following table illustrates various stabilizer compositions used as well as time to embrittle for the samples.

TABLE

| Example No. | Stabilizer composition | Time to embrittle (hrs.) |
|---|---|---|
| 1 | Control (no additive) | 30 |
| 2 | 1.0% hexamethylphosphoric triamide | 60 |
| 3 | 2% hexamethylphosphoric triamide | 90 |
| 4 | 2% octamethylpyrophosphoramide | 140 |
| 5 | 2% hexamethylphosphoric triamide, 1% $B_2O_3$ | 150 |
| 6 | 2% octamethylpyrophosphoramide, 1% $B_2O_3$ | 240 |
| 7 | 2% octamethylpyrophosphoramide, 1% boric acid. | 230 |
| 8 | 2% octamethylpyrophosphoramide, 1% trioctyl borate. | 160 |
| 9 | 2% octamethylpyrophosphoramide, 2% tripenyl borate. | 180 |
| 10 | 2% octamethylpyrophosphoramide, 2% triisobutyl borate. | 190 |
| 11 | 2% octamethylpyrophosphoramide, 2% phenyl boric acid. | 210 |

It should be understood that the invention is susceptible to further modification within the scope of the appended claims.

What I claim as new and desire to secure by Letters Patent of the United States is:

1. A stabilized polyphenylene ether composition consisting of a major portion of a polyphenylene ether and a stabilizing quantity of an octaalkylpyrophosphoramide having the general formula

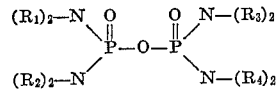

wherein $R_1$, $R_2$, $R_3$ and $R_4$ are alkyl groups having from 1–6 carbon atoms.

2. The stabilized polyphenylene ether composition of claim 1 containing as an additional stabilizer in an amount not to exceed the amount of octaalkylpyrophosphoramide, a boron compound selected from the group consisting of
  (a) boron oxide;
  (b) a boron acid of the formula

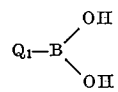

wherein $Q_1$ is a member selected from the group consisting of hydroxyl, alkyl having from 1–15 carbon atoms, and monocyclic aryl; and
  (c) a boron ester of the formula

wherein $Q_2$, $Q_3$ and $Q_4$ are members selected from the group consisting of hydrogen, alkyl, having from 1–20 carbon atoms and monocyclic aryl, provided that at least one of said $Q_2$, $Q_3$ and $Q_4$ be other than hydrogen.

3. The stabilized polyphenylene ether composition of claim 1 wherein the polyphenylene ether is a poly-(2,6-dimethyl-1,4-phenylene) ether.

4. The stabilized polyphenylene ether composition of claim 1 wherein the stabilizer constitutes from 0.1 to 10.0% by weight of the composition, calculated on the polymer.

5. The stabilized polyphenylene ether composition of claim 1 wherein the stabilizer constitutes from 1.0 to 6.0% by weight of the composition, calculated on the polymer.

6. The stabilized polyphenylene ether composition of claim 1 wherein the stabilizer consists essentially of from 1.0 to 3.0 parts by weight octamethylpyrophosphoramide and from 0.5 to 1.5 parts of the boron compound.

7. A stabilizer composition consisting essentially of:
  (1) from 1.0 to 3.0 parts by weight of an octaalkylpyrphosphoramide having the general formula

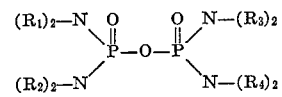

wherein $R_1$, $R_2$, $R_3$ and $R_4$ are alkyl groups having from 1–6 carbon atoms; and
  (2) from 0.5 to 1.5 parts by weight of a boron compound selected from the group consisting of
    (a) boron oxide;
    (b) a boron acid of the formula

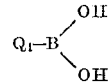

wherein $Q_1$ is a member selected from the group consisting of hydroxyl, alkyl having from 1–15 carbon atoms, and monocyclic aryl; and
    (c) a boron ester of the formula

wherein $Q_2$, $Q_3$ and $Q_4$ are members selected from the group consisting of hydrogen, alkyl, having from 1–20 carbon atoms and monocyclic aryl, provided that at least one of said $Q_2$, $Q_3$ and $Q_4$ be other than hydrogen.

References Cited

UNITED STATES PATENTS

| 3,100,197 | 8/1963 | Heuck et al. | 260—45.9 |
| 3,131,164 | 4/1964 | Doyle et al. | 260—45.8 |
| 3,134,753 | 5/1964 | Kwiatek. | |
| 3,193,521 | 7/1965 | Jasching | 260—45.8 |
| 3,257,357 | 6/1966 | Stamatoff. | |
| 3,306,874 | 2/1967 | Hay | 260—47 |

HOSEA E. TAYLOR, Jr., Primary Examiner.

U.S. Cl. X.R.

252—400; 260—45.7